Nov. 5, 1957  C. A. MERCER  2,812,125
FISH STRINGER
Filed April 16, 1954
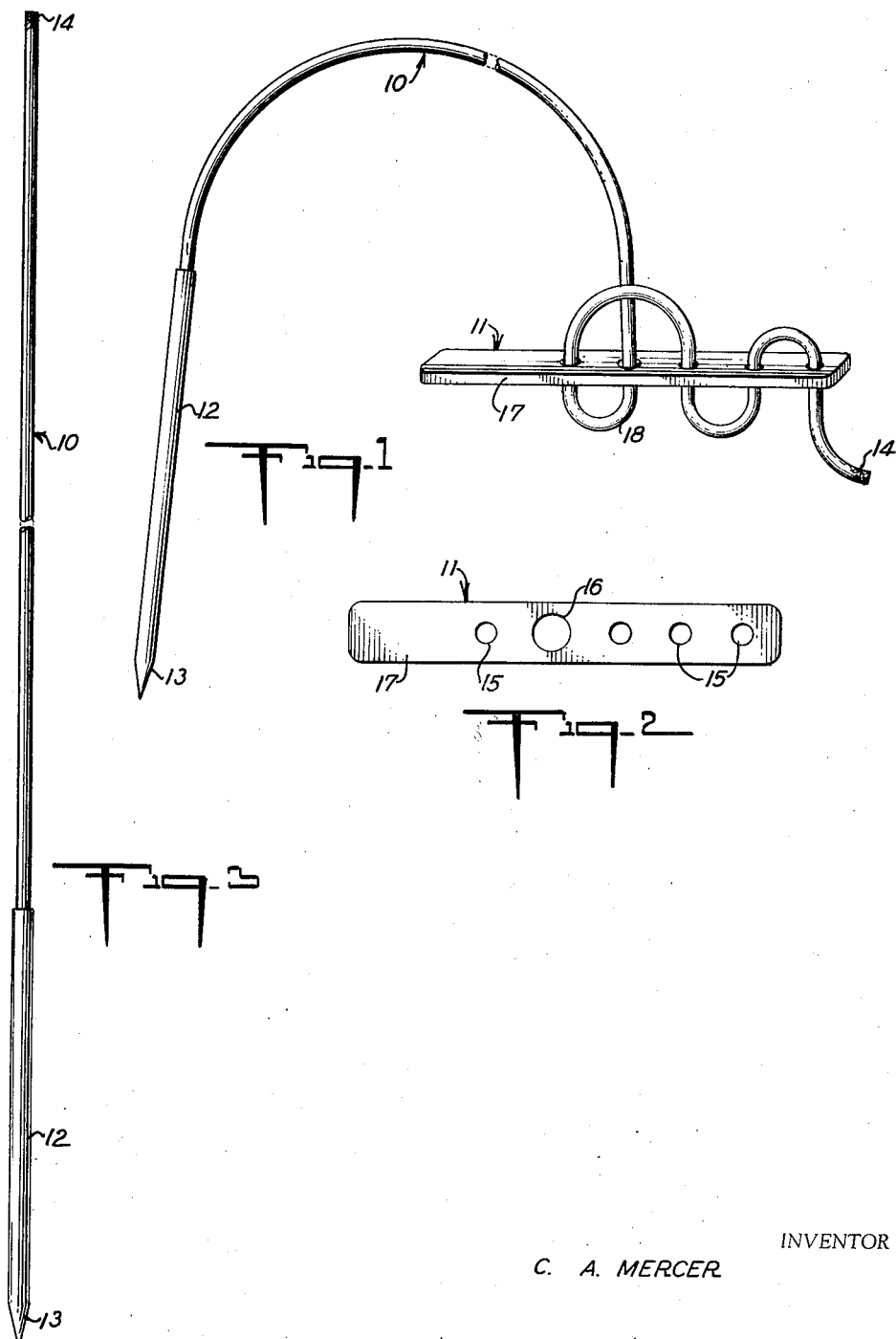
INVENTOR
C. A. MERCER
BY
ATTORNEYS

United States Patent Office 2,812,125
Patented Nov. 5, 1957

2,812,125

FISH STRINGER

Clifton A. Mercer, Tampa, Fla.

Application April 16, 1954, Serial No. 423,654

1 Claim. (Cl. 224—7)

This invention relates to sporting goods and more particularly to a device for use by fishermen to receive and support a plurality of fish either to facilitate carrying the same or to support such fish in the water to maintain the same in a fresh condition.

Heretofore, many different types of devices for carrying fish have been proposed and utilized including various types of fish stringers and also baskets or creels for receiving and carrying the fish. However, most of these devices have been relatively expensive and also quite complicated to use and furthermore have included parts which were subject to breakage or wear and which after a relatively short time render the device useless. Furthermore, these prior art devices in many instances, included a relatively large number of parts which increased the likelihood of losing such parts and thereby rendering the device inoperative.

It is accordingly an object of this invention to provide a fish stringer which may be economically manufactured of a minimum number of parts and in which fish may be applied to the device or removed therefrom by a very simple manual manipulating operation.

A further object of the invention is the provision of a fish stringer comprising only two parts and in which all of such parts may be made of relatively light, yet strong rust proof materials.

A still further object of the invention is the provision of a fish stringer in which a plurality of fish may be applied thereto and in which one or more of such fish may be conveniently removed therefrom by a simple manipulating operation.

Another object of the invention is the provision of a fish stringer which will serve to support and carry a relatively large number of fish without in any way injuring or mutilating such fish.

A further object of the invention is the provision of a fish stringer comprising two parts in which one of such parts may be composed of a flexible member made of relatively strong rock proof material such as nylon.

A still further object of the invention is the provision of a fish stringer comprising two parts, in which the fish may be applied thereto by a simple threading operation.

Further objects and advantages of the invention will be apparent from the following description taken in conjunction with the accompanying drawing wherein:

Fig. 1 is a view in perspective showing a fish stringer constructed in accordance with this invention;

Fig. 2, a top plan view of the plate or keeper utilized in conjunction with the flexible member of the fish stringer of this invention; and Fig. 3, an elevational view of the flexible member and needle comprising one part of the fish stringer of this invention.

With continued reference to the drawing there is shown a fish stringer constructed in accordance with this invention and which comprises in the main an elongated flexible member 10 and a plate or keeper 11. The flexible member 10 may be of any desired length and may be formed of braided nylon yarn or may be formed of any other suitable material, such as braided stainless steel wire, ordinary cotton or hemp cord or a solid plastic member. However, nylon is preferred since such material is both exceedingly strong and rot-proof and also the same may be treated in certain ways to be hereinafter described, which materially increase the efficiency and ease of manipulation of fish stringer of this invention.

The flexible member 10 may be provided on one end thereof, with an elongated needle 12 which may be formed of plastic molded onto the end of the flexible member 10 or may be formed of other materials, such as a metallic member molded on the end of the flexible member 10. Furthermore, if desired, the needle 12 could be formed by dipping the end of the flexible member 10 in a suitable plastic which after setting would form a rigid, elongated needle such as that shown in the drawing. The end of needle 12 is sharpened, as shown at 13 in order to facilitate threading of the needle 12 and the flexible member 10 through the gills and mouth of the fish to be supported on the fish stringer of this invention.

Since nylon is a plastic and may be melted, the flexible member 10 if formed from braided nylon yarn may be prevented from ravelling at the opposite end of the member 10 from the needle 12 by melting the nylon for a limited distance to provide a relatively solid end 14 which will prevent ravelling of the braided flexible member 10 and will also facilitate threading the flexible member through the apertures in the plate or keeper 11 to be described below. This property of nylon makes such material particularly useful for the flexible member 10 of the fish stringer of this invention since were a cord such as cotton or hemp utilized, it would be necessary to bind the end thereof, in some way to prevent ravelling, and the same would likewise be true of stainless steel wire.

The plate or keeper 11 is an elongated, generally rectangular member which may be provided with a plurality of spaced apertures 15 of the same diameter and an intermediate aperture 16 of a relatively larger diameter. The apertures 15 and 16 may be located toward one end of the plate or keeper 11, leaving the opposite end 17 free to provide a convenient gripping portion to be held in the hand of the fisherman while utilizing this device.

In using the fish stringer of this invention, as shown in Fig. 1, the flexible member 10 is threaded through the smaller apertures 15 in the plate or keeper 11 with the end 14 of the flexible member 10 projecting a short distance from the plate or keeper 11. If desired, the flexible member 10 need only be threaded through the smaller holes or apertures 15 at the start, and after catching the first fish, such fish is threaded on the flexible member 10 by inserting the needle 12 through the gills and mouth of the fish and thereafter passing the needle 12 through the enlarged aperture 16 in the plate or keeper 11 which forms a loop 18 which would support the first fish. Thereafter as many fish as desired may be threaded on the flexible member 10 in the manner above described, and these fish would be prevented from sliding off the end of flexible member 10 by the keeper plate 11 secured thereto. When it was desired to remove one or more fish from the flexible member 10, it is only necessary to unthread the same from the end 14 through the apertures 15 and 16 in the plate or keeper 11, at which time as many fish as desired may simply be slipped off the end of the flexible member 10 and thereafter, such flexible member rethreaded through the apertures 15 and 16 in the keeper or plate 11. Since nylon or the other materials mentioned above, are relatively strong in comparison to the size of the flexible member utilized, a relatively large number of fish constituting a relatively great weight may be carried by the fish stringer of this invention and such fish may if desired, be suspended in the water from the boat or from the land depending upon where the fisherman is seated or standing and escape of such fish will be prevented, but at the same time, they will be maintained in a fresh condition until such time as the fisherman leaves the fishing grounds.

It will thus be seen by the above described invention there has been provided an exceedingly simple, yet highly efficient fish stringer which may be constructed of relatively strong, yet lightweight material and which comprises only two parts thereby reducing the likelihood of losing one or more parts which would tend to render the device inoperative and useless. Furthermore, the device may be utilized by relatively simple manipulating operations which do not require any particular strength in the hand or fingers and yet will serve to support a relatively great number and weight of fish.

It will be obvious to those skilled in the art that various changes may be made in the invention without departing from the spirit and scope thereof and therefore, the invention is not limited by that which is shown in the drawing and described in the specification, but only as indicated in the appended claim.

What is claimed is:

A fish stringer comprising an elongated flexible element of braided plastic, one end of said element being fused to provide rigidity and prevent unraveling of said element, a sharpened elongated needle comprising a coating of plastic on the opposite end of said element, an elongated one-piece substantially flat keeper plate, a plurality of spaced apertures of the same diameter in said plate, an aperture of larger diameter between one end aperture and the next adjacent aperture whereby said element may be threaded through said apertures of smaller diameter to retain said plate thereon and through said larger aperture to provide a loop passing through a gill and the mouth of a fish to retain the same thereon, additional fish being threaded on said element by passing said needle through the mouth and gill, said fish being removed by removing said plate.

References Cited in the file of this patent
UNITED STATES PATENTS

| | | |
|---|---|---|
| 1,465,754 | Berolzheimer | Aug. 21, 1923 |
| 2,316,511 | Flournay | Apr. 13, 1943 |
| 2,424,658 | Hanson | July 29, 1947 |
| 2,455,766 | Harvey | Dec. 7, 1948 |
| 2,523,974 | Stonich | Sept. 26, 1950 |
| 2,695,506 | Kohlmann | Nov. 30, 1954 |